(No Model.)

N. R. WEAVER.
LUBRICATOR FOR PISTONS.

No. 550,548. Patented Nov. 26, 1895.

Witnesses.

Inventor.
Norman R. Weaver,
By James L. Norris.
Atty.

UNITED STATES PATENT OFFICE.

NORMAN R. WEAVER, OF SELMA, ALABAMA.

LUBRICATOR FOR PISTONS.

SPECIFICATION forming part of Letters Patent No. 550,548, dated November 26, 1895.

Application filed March 7, 1895. Serial No. 540,875. (No model.)

*To all whom it may concern:*

Be it known that I, NORMAN R. WEAVER, a citizen of the United States, residing at Selma, in the county of Dallas and State of Alabama, have invented new and useful Improvements in Lubricators for Pistons, of which the following is a specification.

My invention relates to an improved piston-lubricator for steam and other engines, and has for its object to provide an efficient and economical lubricator of the type described, by means of which the lubricant is forced around the piston by the pressure of the steam in the cylinder and operates to apply the lubricant directly to the working parts and in quantities proportionate to the consumption of the lubricant.

It also has for its object to provide a lubricator of the character described which shall have no working parts movable with respect to one another, thus avoiding wear and liability of derangement of the parts, and it finally has for its object to provide improved means for charging the lubricator and for adjusting the feed thereof without disturbing the cylinder or its piston.

To these ends my invention consists in the novel features and in the construction and arrangement of parts hereinafter fully described, and definitely pointed out in the claims following the description, due reference being had to the accompanying drawings, forming a part of this specification, wherein—

Figure 1:
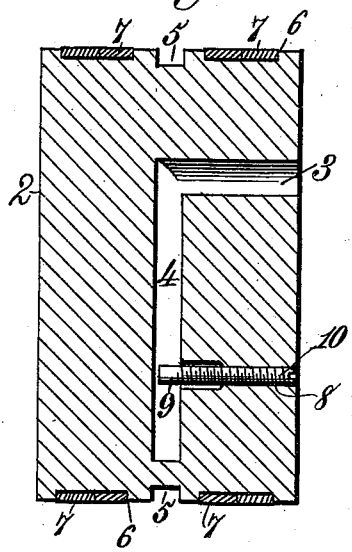
Figure 2:
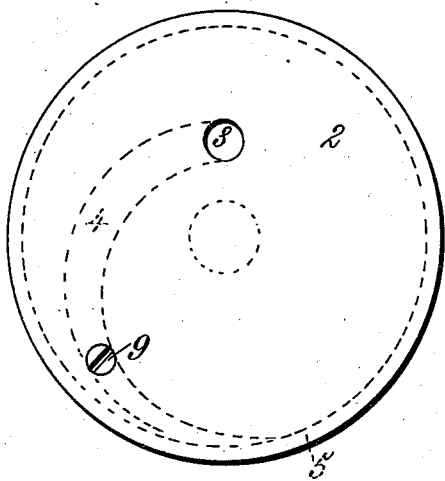
Figure 3:
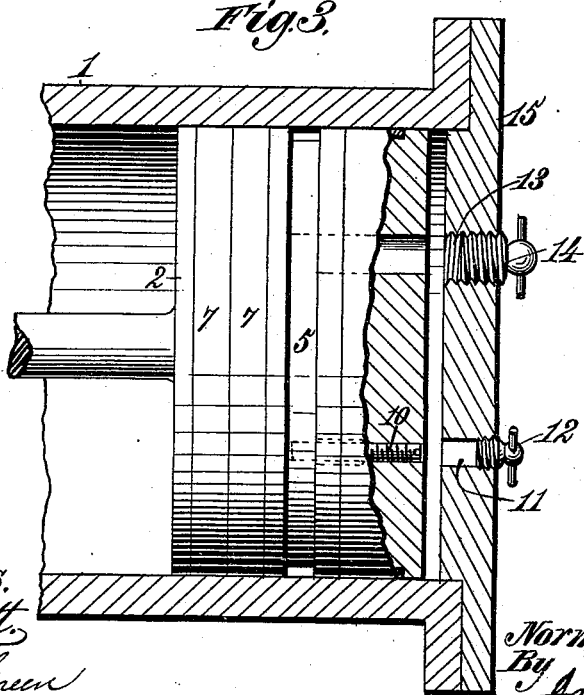

Figure 1 is a longitudinal central section of a piston provided with my improved lubricator. Fig. 2 is an end view thereof. Fig. 3 is a longitudinal section of the cylinder and pistons, illustrating the manner of charging the lubricator and adjusting the feed-regulating valve.

Referring to the drawings, the numeral 1 indicates the cylinder of a steam-engine, and 2 its piston. The piston 2 is provided with an internal chamber for the reception of the lubricant, consisting of a horizontal channel 3, bored from one side of the piston to a point approximately midway between its opposite sides and communicating at its inner end with one end of a spiral-shaped channel 4, which at its other or outer end terminates in or communicates with a circumferential groove 5, formed in the periphery of the piston-head intermediate the ends of the latter. As shown, the channel 3 is disposed between the axial center of the piston and its periphery and is of greater diameter than the channel 4, and the latter channel is of a gradually-diminishing diameter or area in cross-section from its point of junction with the channel 3 to the point where it communicates with the circumferential groove 5. The piston 2 upon opposite sides of the groove 5 is provided with circumferential grooves 6, within which are inserted packing-rings 7 of ordinary or any preferred construction, and which are designed to tightly fit within the cylinder 1.

An aperture 8 is bored from one face of the piston in such manner as to intercept the channel 4, and is interiorly threaded for a portion of its length, as shown. Inserted through said aperture and projecting into and across the channel 4 is a valve 9, provided with a threaded stem 10, which is tapped into said threaded aperture and at its outer end is provided with a nicked head adapted for engagement by a screwdriver or otherwise formed for engagement by a suitable tool, by means of which the threaded stem may be turned to adjust the valve.

In order that the valve may be adjusted without removing the cylinder-head 15, I provide the latter with an orifice 11, bored through the cylinder-head at a point opposite to the head of the valve-stem 10, and close said orifice by means of a threaded plug 12, which fits therein steam tight. A similar orifice 13 is bored in the cylinder-head at a point that registers with the channel 3 and is closed by a screw-plug 14, that fits said orifice steam-tight.

To adjust the valve 9, the piston is stopped when at the end of its stroke toward the cylinder-head 15, and hence in proximity to the latter. The plug 12 is then removed and a screwdriver or other suitable tool is inserted through the orifice 11 and the stem 10 of the valve 9 turned in the proper direction to adjust the valve to the position desired, after which the plug is returned to its seat. The piston is also stopped in like manner when it becomes necessary to recharge the chamber in the piston with lubricant, and the plug 14 is removed. The discharge-nozzle of a portable pump of any suitable construction is then inserted through the orifice 13 into the channel 3, and a suitable supply of lubricant is forced into the chamber in the piston, after which the pump is removed and the plug 14 returned to its seat.

The chamber in the piston being supplied with lubricant and the valve having been adjusted to the proper position to permit the appropriate passage of the lubricant through the channel 4, the lubricator is prepared for operation. As the piston is moved back and forth the pressure of the steam, which has free access to the lubricant through the channel 3, forces the lubricant through the channel 4 into and around the circumferential groove 5 and around the piston. The force with which the lubricant is forced around the piston is commensurate with the pressure of the steam in the cylinder, and inasmuch as there is still a back-pressure of the exhaust-steam behind the piston when the live steam is cut off the lubricant will be held under pressure against the cylinder and around the piston during the entire time the piston is working. The packing-rings 7 serve to prevent the escape of lubricant between the ends of the piston and the cylinder, and the pressure of the steam forces the lubricant between the piston and the cylinder with such force as to make the piston work practically steam-tight.

It will be observed that the lubricator has no parts that are movable with respect to one another, and hence no portion of the same is subject to wear or derangement, and also that the improved lubricator may with equal facility be applied to new engines or to engines that are in use.

By forming the chamber that holds the lubricant in the manner described I am enabled to make it of sufficient capacity to hold a quantity of lubricant that will render unnecessary frequent recharging, and at the same time avoid weakening the piston appreciably, and the spiral form of the channel 4, that communicates with the circumferential groove 5 by a gradual and almost imperceptible curve, causes the lubricant to enter said groove with almost no resistance and with a motion that facilitates its passage around the piston. However, the form and size of the channels in the piston constituting the lubricant-reservoir may be varied without departing from the spirit of my invention, that shown above being only illustrative of one of the preferred forms.

Having described my invention, what I claim is—

1. In a piston lubricator, the combination with the cylinder, of a piston having a circumferential groove and formed with an internal reservoir communicating with said groove, a port communicating with the upper end of said reservoir and with the steam space of the cylinder, and an adjustable valve arranged between the inlet and outlet ends of the reservoir and operating to regulate the discharge of the lubricant, substantially as described.

2. In a piston lubricator, the combination with the cylinder, of a piston having a circumferential groove, and provided with an internal spiral channel communicating at one end with said groove and provided at its other end with a port communicating with the steam space of the cylinder, substantially as described.

3. In a piston lubricator, the combination with the cylinder, of a piston having a circumferential groove and an internal reservoir communicating with said groove, and provided with a port opening into the steam space of the cylinder, an orifice formed in the cylinder head and adapted to register with said port, and a removable plug for closing said orifice steam tight, substantially as described and for the purpose specified.

4. In a piston lubricator, the combination with the cylinder, of a piston having a circumferential groove and an internal reservoir communicating with said groove and provided with a port communicating with the steam space of the cylinder, an adjustable valve for controlling the communication between said groove and reservoir and having an adjustable stem accessible from the face of the piston, an orifice formed in the piston head and registering with said stem and a removable plug for closing said orifice steam tight, substantially as described and for the purpose specified.

In testimony whereof I have hereunto set my hand in presence of two subscribing witnesses.

NORMAN R. WEAVER.

Witnesses:
J. SYD. ROBBINS,
GEO. WM. LEWIS.